(No Model.)
A. J. & B. McC. HARRINGTON.
COMBINED PLANTER AND FERTILIZER DISTRIBUTER.
No. 514,071. Patented Feb. 6, 1894.
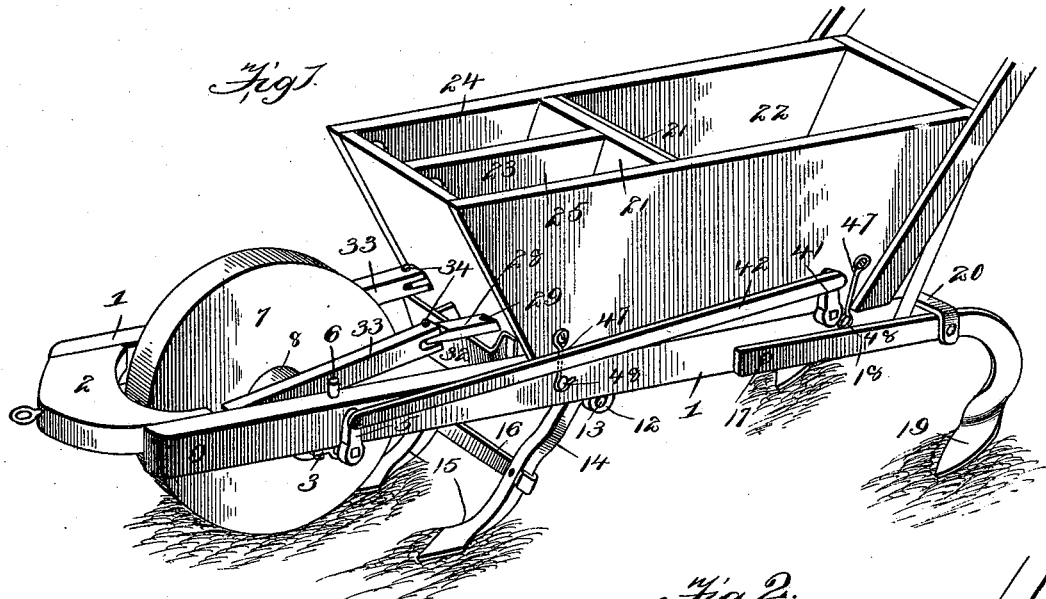
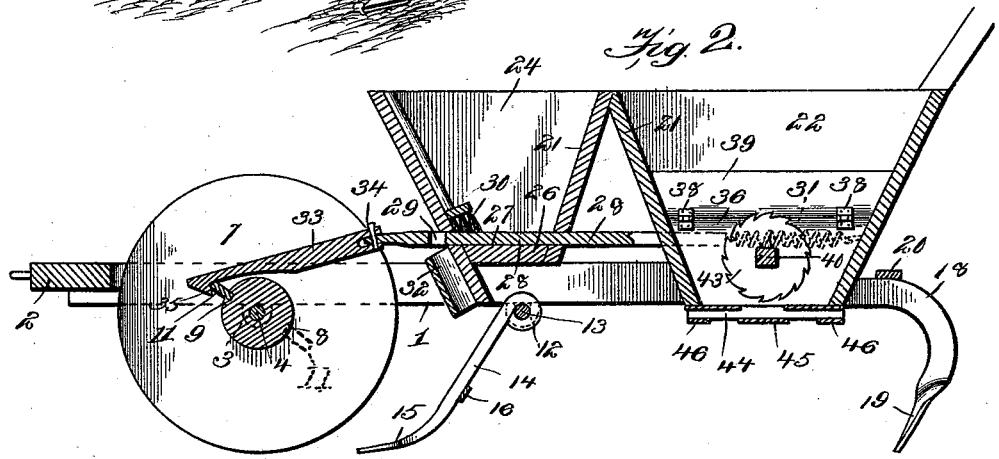
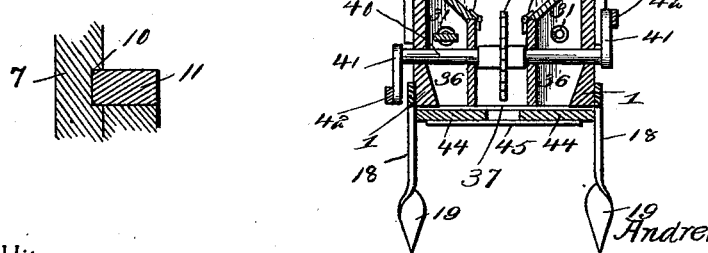
Witnesses
John C. Shaw
W. S. Duvall
Inventors
Andrew Jackson Harrington
Benjamin McCollough Harrington
By their Attorneys
C. A. Snow & Co.

UNITED STATES PATENT OFFICE.

ANDREW JACKSON HARRINGTON AND BENJAMIN McCULLOUGH HARRINGTON, OF MAGNOLIA, ARKANSAS.

COMBINED PLANTER AND FERTILIZER-DISTRIBUTER.

SPECIFICATION forming part of Letters Patent No. 514,071, dated February 6, 1894.

Application filed September 26, 1893. Serial No. 486,561. (No model.)

*To all whom it may concern:*

Be it known that we, ANDREW JACKSON HARRINGTON and BENJAMIN McCULLOUGH HARRINGTON, citizens of the United States, residing at Magnolia, in the county of Columbia and State of Arkansas, have invented a new and useful Combined Planter and Fertilizer-Distributer, of which the following is a specification.

Our invention relates to improvements in agricultural machines; and has special reference to that class thereof known as combined planters and fertilizer-distributers.

The objects of our invention are to provide a cheap and simple construction of fertilizer-distributer, the same being so constructed and arranged as to adapt it to drop at proper distances apart corn or alternately corn and peas, and also to drop in conjunction with either corn or corn and peas a suitable fertilizing-agent, the latter being deposited in the drill or row of the planted grain and covered therewith and by the same mechanism.

Other objects and advantages of the invention will appear in the following description, and the novel features thereof will be particularly pointed out in the claims.

Referring to the drawings:—Figure 1 is a perspective view of a planter embodying our invention. Fig. 2 is a vertical longitudinal sectional view. Fig. 3 is a transverse sectional view through the rear compartment of the hopper. Fig. 4 is a cross-sectional view through part of wheel and hub.

Like numerals of reference indicate like parts in all the figures of the drawings.

In practicing our invention we employ a framework for the planter which, as shown, consists in the present instance of the opposite side-beams 1, which are longitudinally disposed and connected at their front ends by the cross-piece 2, to which any suitable draft-device may be applied. The under sides of the side-beams 1 are provided with bearings 3, and in the same is journaled a transverse axle 4, which at its opposite ends terminates in cranks 5 that are reversely disposed to each other. Above the axle upon the side-beams, pins 6, are located, and upon the axle between the side-beams, a ground-wheel 7 is mounted. This wheel 7 has located at opposite sides hubs 8, which project from the faces of the wheel, and their peripheries are provided with notches 9 which correspond with openings 10 formed in the face of the wheel and which receive removable teeth 11, the teeth being located at diametrically opposite sides, as shown.

In bearing-eyes 12 located upon the under sides of the beams 1, a transverse shaft 13 is located, and a pair of standards 14 having eyes at their upper ends receive the shaft and terminate at their lower ends in shovels 15, the said standards being connected by a cross-bar 16.

By means of bolts 17 we connect to the opposite beams 1 near their rear ends a pair of goose-neck standards 18, whose rear ends are provided with covering-shovels 19. These standards are connected in rear of the framework by means of a cross-bar 20. This completes the construction of the framework, which of course may be changed in its details, as it forms no very important part of our invention. Seated upon the framework thus constructed is the hopper, and the same is oblong when viewed in plan. This hopper is divided transversely by the slanting partitions 21, thus forming a rear compartment 22 and a front compartment, the latter being subdivided by a longitudinal partition 23 into opposite compartments 24 and 25. The bottoms 26 of the two compartments 24 and 25 are provided with longitudinally disposed grooves or recesses 27, which grooves register with openings formed in the front wall of the hopper and the partitions 21. In these grooves are located seed-slides 28, the same projecting through the openings in the front wall and partitions of the hopper and provided between their ends each with a seed-cup or opening 29. Located over these slides 28 and secured to the front wall of the hopper in each compartment 24 and 25 is a cut-off brush 30, which prevents the seed from following the slides through the front openings. The rear ends of these slides are connected to the rear wall of the hopper by means of coiled springs 31, which normally retract the slides. To the exterior of the front wall of the hopper an inclined seed-spout 32 is secured, the same being designed to receive the seed from each slide and drop the same in rear of the ground-wheel and front shovels 15.

33 designates a pair of latch or connecting-bars, the same having their rear ends bifurcated and pivoted each to the front end of a seed-slide, as indicated at 34. The front ends of these latch-bars are provided with beveled shoulders 35, and by reason of the pivotal connection between the bars and the slides, the said latch-bars may be deposited upon the hubs 8 of the ground-wheel and thus be in position to be engaged alternately by the teeth 11 arranged upon the hubs, or they may be engaged over the pins 6 and held out of operative position. Of course when the latch-bars are in position for engagement by the teeth, the same will be engaged by the latter and thrown forward or reciprocated against the tendency of their springs and thus grain caught by the seed-cups or openings in the slides will be drawn under the brushes to the outside of the hopper and dropped into the seed-spout, whereby it will be deposited in the furrow formed by the furrow-opening shovels 15, and afterward covered by the furrow-covering shovels 19 following thereafter.

By reason of the pivotal connection between the slides 31 and the latch or connecting-bars 33, it will be observed that either or both of the bars 33 may be engaged over the pins 6. In such case, where both bars are thus engaged over the pins 6, the slides of the hoppers will remain inactive, or where one is engaged over the pin and the other is arranged in operative position upon the hub, the latter will serve to operate that slide to which it is connected. Thus, it will be seen, that the machine may be so arranged that the two slides will be operated alternately, neither may be operated, or either one may be operated. Peas may be discharged from one hopper and corn from the other, if desired, or any other two cereals or grain, so that we may produce rows of plants that are composed alternately of peas and corn.

The rear hopper is intended for distributing fertilizer, and may or may not be employed as desired. The said hopper is divided by a pair of longitudinal partitions 36 for a portion of its height, the said partitions combining to produce a discharge-spout 37. The upper edges of the partitions have hinged thereto as at 38 a pair of leaves 39, which leaves when swung outward or away from each other against the side walls of the partitions form the inclined bottom for the hopper and serve to dispose the fertilizing agent to the spout. These leaves also cover the springs 31, and may be readily swung up to give access to the same if it is desired to replace or repair them.

A transverse shaft 40 is journaled in the side-walls of the hopper at the center of the rear compartment 22, and the ends of the shaft beyond said side walls are provided with cranks 41 which are connected by means of connecting bars 42 with the cranks 5 before mentioned as being formed at the opposite ends of the axle. This shaft is provided with any suitable agitating device, as for instance, a saw 43 which is rotated with the shaft and serves to agitate in a thorough manner the fertilizing agent and consequently feed the same through the opening in the bottom of the hopper. The bottom of the hopper has applied at each side of its center a pair of longitudinal strips 44 above which a pair of transverse plates 45 is located, the plates 45 being spaced apart to permit the fertilizer to fall therethrough. The strips are connected upon their under sides by cross-strips 46.

The hopper is provided at its opposite sides with pivoted hooks 47 which are designed to engage with studs 48 with which the beams 1 are provided. By this means the hopper may be removed from the framework and other hoppers substituted.

We do not limit our invention to the precise details of construction herein shown and described, but hold that we may vary the same to any degree and extent within the knowledge of the skilled mechanic.

Having described our invention, what we claim is—

1. The combination with a planter-frame, a ground-wheel carrying opposite teeth, furrow opening and closing shovels, of a hopper arranged upon the frame-work, the same being longitudinally subdivided to form opposite compartments said compartments having their bottoms grooved, seed-slides arranged in the bottoms, cut-offs arranged over the slides, retracting springs connected to the rear ends of the seed-slides, latch-bars pivoted to the front ends of the slides and arranged in the path of the teeth, and devices arranged on the side-bars of the framework for supporting the latch-bars out of operative engagement with the teeth of the wheel substantially as specified.

2. The combination with a planter-frame, a ground-wheel carrying teeth, and shovels, of a hopper arranged upon the frame work, said hopper being subdivided by a longitudinal partition forming opposite compartments having their bottoms grooved, seed-slides arranged in the bottoms, cut-offs arranged over the slides, retracting springs connected to the rear ends of the seed-slides, vertical latch-bar connecting pins arranged on the framework at opposite sides of the ground-wheel, and latch-bars pivotally connected to the front ends of the seed-slides and adapted to engage the teeth or the pins and thus be supported out of operative position with relation to the teeth of the wheel, substantially as specified.

3. The combination with the planter-frame, the axle having the cranks, the ground-wheel, the hubs, and the teeth, of the furrow-forming and covering shovels depending from the framework, the hoppers arranged upon the framework and having a transverse partition subdividing the hopper into front and rear compartments, a front partition subdividing the front compartment, seed-slides arranged in the bottoms of the front compartments and having openings, a seed-spout secured to the front wall of said compartments, brushes arranged over the slides, latch-bars connected to the front ends of the slides and adapted to be arranged in the path of the teeth, longitudinal partitions arranged in the rear compartment of the hopper, leaves hinged at the upper edge of the partitions, retracting springs arranged under the leaves and connected to the slides, a transverse shaft arranged in the walls of said rear compartment, an agitating saw mounted on the shaft, cranks on the ends of the axle, and connecting rods between said cranks, substantially as specified.

4. The combination with a planter-frame, the ground-wheel, the front and rear furrow forming and covering shovels, respectively, of the cranks on the axle of the ground-wheel, a hopper arranged on the frame and having a transverse partition forming front and rear compartments, and a longitudinal partition subdividing the front compartment, feed-openings arranged in the three compartments, a transverse shaft in the rear compartment, a rotary feed device arranged thereon in said compartment, cranks on the ends of the said transverse shaft, pitman-rods between the cranks of said shaft and those of the axle, of the ground-wheel and feed device actuated by the ground-wheel and arranged in the front compartments, substantially as specified.

In testimony that we claim the foregoing as our own we have hereto affixed our signatures in the presence of two witnesses.

ANDREW JACKSON HARRINGTON.
BENJAMIN McCULLOUGH HARRINGTON.

Witnesses:
T. C. MONROE,
C. C. LYLE.